United States Patent
Bunce et al.

(10) Patent No.: US 8,725,448 B2
(45) Date of Patent: May 13, 2014

(54) SELF VALIDATING GAS TURBINE ENGINE FLAME DETECTION SYSTEM USING DUEL OPTICAL VERIFICATION

(75) Inventors: Richard H. Bunce, Altamonte Springs, FL (US); Upul P. Desilva, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 649 days.

(21) Appl. No.: 12/888,457

(22) Filed: Sep. 23, 2010

(65) Prior Publication Data
US 2012/0078579 A1 Mar. 29, 2012

(51) Int. Cl.
*G06F 15/00* (2006.01)

(52) U.S. Cl.
USPC ...... 702/135; 702/134; 702/136; 250/339.15; 250/372; 431/12; 431/69; 431/79

(58) Field of Classification Search
USPC ........ 702/135, 127, 134, 136; 431/79, 12, 69, 431/77, 18; 250/339.15, 372
See application file for complete search history.

(56) References Cited

U.S. PATENT DOCUMENTS 6,135,760 A * 10/2000 Cusack et al. ............... 431/79
2007/0281260 A1 12/2007 McLellan

FOREIGN PATENT DOCUMENTS

| EP | 1953454 A1 | 8/2008 |
| EP | 2224173 A2 | 9/2010 |
| WO | 9930006 A2 | 6/1999 |

OTHER PUBLICATIONS

Det-Tronics, UV/IR Flame detection system R7495B controller, C7052J detector (Detector Electronic Corporation 2003).*

* cited by examiner

*Primary Examiner* — Jonathan C Teixeira Moffat
*Assistant Examiner* — Hien Vo

(57) ABSTRACT

A self validating flame detection system (10) for a turbine engine (12) configured to determine whether a flame exists in a turbine engine combustor is disclosed. The self validating flame detection system (10) may include two different types of flame detection sensors to reduce the risk of false positive signals. In at least one embodiment, the flame detection system (10) may include one or more infrared sensors (20) that sense infrared radiation within the combustor of the turbine engine (12) and one or more ultraviolet light sensors (22) that sense ultraviolet light within the combustor of the turbine engine (12). The flame detection system (10) may include a processor (24) configured to ignore the steady state infrared signal generated and instead analyze the dynamic infrared signal. The processor (24) may be configured to determine whether both types of sensors indicate a flame out condition so that a false alarm does not occur.

14 Claims, 1 Drawing Sheet

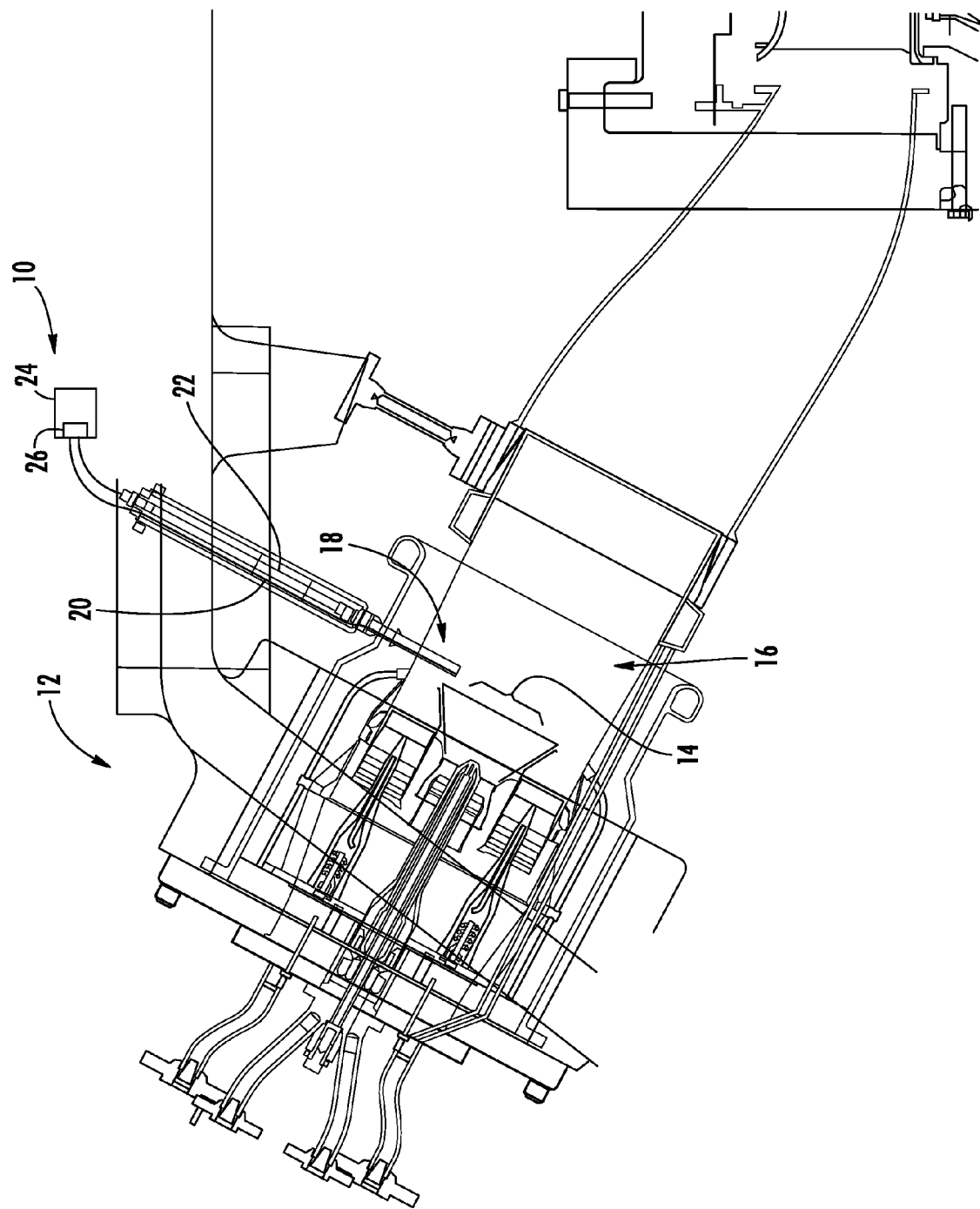

SELF VALIDATING GAS TURBINE ENGINE FLAME DETECTION SYSTEM USING DUEL OPTICAL VERIFICATION

FIELD OF THE INVENTION

This invention is directed generally to turbine engines, and more particularly to flame detection systems for turbine engines.

BACKGROUND

In gas turbine engines, flame detection in the combustion chambers is important for optimizing engine operation and for safety. Some countries require that gas turbine engines include flame detectors that directly sense flame-on and flame-off conditions. Typically, a single type of flame detection system has been used within gas turbine engines. However, false flame extinguished conditions have been signaled in such systems. Thus, a need exists for a more robust system having less likelihood of falsely identifying flame out conditions.

SUMMARY OF THE INVENTION

This invention is directed to a self validating flame detection system for a turbine engine configured to determine whether a flame exists in a turbine engine combustor. The self validating flame detection system may include two different types of flame detection sensors to reduce the risk of crating false positive signals. In at least one embodiment, the flame detection system may include one or more infrared sensors that sense infrared radiation within the combustor of the turbine engine and one or more ultraviolet light sensors that sense ultraviolet light within the combustor of the turbine engine. The flame detection system may include a processor configured to ignore the steady state infrared signal generated and instead analyze one or more dynamic infrared signals. The processor may be configured to determine whether both types of sensors indicate a flame out condition so that a false alarm does not occur and the system shut down when such a shutdown is not warranted.

The flame detection system may include one or more infrared sensors that are configured to sense infrared radiation within the turbine engine, one or more ultraviolet light sensors that sense ultraviolet light within the turbine engine, and one or more processors in communication with the infrared sensor and the ultraviolet light sensor. The processor may include a receiver for receiving signals from the infrared sensor. The processor may be configured to ignore a steady state signal and analyzes a dynamic signal received from the infrared sensor to determine whether a lack of flame condition exists in a combustor of the turbine engine. By analyzing only the dynamic signal, steady state signals from hot components in the combustor, such as the walls forming the combustor, may be ignored, thereby enabling the determination of the existence of a flame to be made. The processor may also receive signals from the ultraviolet sensor, wherein the processor may analyze a dynamic signal received from the ultraviolet light sensor to determine whether a lack of flame condition exists in a combustor of the turbine engine.

The processor may receive signals from the infrared sensor and from the ultraviolet sensor within a threshold time period and may analyze the signals to determine whether both the infrared and the ultraviolet light sensors indicate a lack of flame condition in a combustor of a turbine engine. In one embodiment, the ultraviolet sensor and the infrared sensor may each transmit a signal to the processor at least every five seconds. In particular, the ultraviolet sensor and the infrared sensor may each transmit a signal to the at least one processor at least every two seconds.

An advantage of the self validating flame detection system is that the likelihood of generating a false flame extinguished signal is reduced compared to conventional single type sensor systems because the self validating flame detection system includes at least two different types of sensors. Because each different type of sensor tests for the existence of a flame in different ways, such as by testing for the existence of different things, there is a decreased likelihood that both sensors will produce a false positive signal at the same time, thereby reducing the likelihood of shutting down the turbine engine because of misinformation that a flame does not exist in the combustor.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 1 is a partial side view of a gas turbine engine showing a combustor with a self validating flame detection system.

DETAILED DESCRIPTION OF THE INVENTION

As shown in FIG. 1, this invention is directed to a self validating flame detection system 10 for a turbine engine 12 configured to determine whether a flame 14 exists in a turbine engine combustor 16. The self validating flame detection system 10 may include at least two different types of flame detection sensors 18 to reduce the risk of false positive signals. In at least one embodiment, the flame detection system 10 may include one or more infrared sensors 20 that sense infrared radiation within the combustor 16 of the turbine engine 12 and one or more ultraviolet light sensors 22 that sense ultraviolet light within the combustor 16 of the turbine engine 12. The flame detection system 10 may include a processor 24 configured to ignore the steady state infrared signal generated and instead analyze one or more dynamic infrared signals. The processor 24 may be configured to determine whether both types of sensors indicate a flame out condition so that a false alarm does not occur and the system shut down when such a shutdown is not required.

In at least one embodiment, the flame detection system 10 may include two different types of sensors 18. For instance, the flame detection system 10 may include one or more infrared sensors 20 that sense infrared radiation within a component, such as the combustor, of the turbine engine 12, and the flame detection system 10 may include one or more ultraviolet light sensor 22 that senses ultraviolet light within the same component of the turbine engine 12. The infrared sensor 20 may be configured as a sensor with any appropriate configuration capable of sensing ultraviolet light. The ultraviolet light sensor 22 may be configured as a sensor with any appropriate configuration capable of sensing ultraviolet light.

The infrared sensor 20 and the ultraviolet light sensor 22 may be positioned in the turbine engine in any appropriate configuration. In one embodiment, the infrared sensor 20 and the ultraviolet light sensor 22 may be attached in separate ports extending into the combustor 16. In another embodiment, both the infrared sensor 20 and the ultraviolet light sensor 22 may be in communication with a single port extending into the combustor 16.

The flame detection system 10 may also include one or more processors 24 in communication with the infrared sensor 20 and the ultraviolet light sensor 22. The processor 24 may include a receiver 26 configured to receive the signals from the ultraviolet and infrared sensors 22, 20. The receiver 26 may be configured to receive signals from the infrared sensor 20, whereby the processor 24 ignores a steady state signal and analyzes a dynamic signal received from the infrared sensor to determine a lack of flame in the combustor 16 of the turbine engine 12. By ignoring the steady state signal, the processor 26 ignores the infrared light emitted from the hot parts in the combustor 16. Instead, the processor 26 analyzes the dynamic infrared light present within the combustor 16 because the dynamic infrared light signals represent the flickering of a flame in the combustor 16. Thus, the presence of a dynamic infrared light signal in the combustor 16 signifies the presence of a flame.

The receiver 26 may also receive a dynamic signal from the ultraviolet light sensor 22 to determine a lack of flame in a combustor 16 of the turbine engine 12. The dynamic signal emitted by the ultraviolet light sensor 22 signifies the presence of a flame in the combustor 16.

The flame detection system 10 may be configured such that at least one of the infrared sensor 20 and the ultraviolet light sensor 22, or both, take a reading to determine whether a flame exists in the combustor 16 within a set time period. The time period may be repetitive such that one or more of the sensors 20, 22 generates a signal within a repeated time period. The repeated time period may be, but does not have to be the exact same time period each time but should be equal to or less than a threshold time period. The time period is set such that should a flame in the combustor 16 be extinguished, there will not be sufficient time for fuel to build up to a dangerous level before the extinguished state is known. In at least one embodiment, the threshold time period may be about five seconds or less, and in particular, may be about two seconds.

The self validating flame detection system 10 may be used during turbine engine operation to monitor the existence of a flame within a combustor 16 of a turbine engine 12. The flame detection system 10 may include a method for determining a presence of a flame in a turbine engine 12 that includes receiving signals generated by the flame detection system 10, analyzing the signals from both the infrared sensor 20 and the ultraviolet sensor 22 to determine whether both sensors 20, 22 have sensed the presence of a flame, and sending a signal representing that a flame does not exist in the combustor 16 so that the turbine engine 12 may be shutdown. The step of analyzing the signals may include ignoring a steady state signal from the infrared sensor 20 and analyzing a dynamic signal received from the infrared sensor 20 to determine the presence of a flame in the combustor 16 of the turbine engine 12. The step of analyzing the signals may also include analyzing a dynamic signal received from the ultraviolet light to determine the presence of a flame in the combustor 16 of the turbine engine 12.

The step of receiving signals generated by the flame detection system 10 for a turbine engine 12 includes generating signals within a threshold time period. In particular, the step of receiving signals generated by the flame detection system 10 for a turbine engine 12 within a threshold time period may include generating a signal within each of the ultraviolet sensor 22 and the infrared sensor 20 and transmitting those signals to the processor 24 at least every five seconds. More particularly, the step of receiving signals generated by the flame detection system 10 for a turbine engine 12 within a threshold time period may include generating a signal within each of the ultraviolet sensor and the infrared sensor and transmitting those signals to the at least one processor at least every two seconds.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. A flame detection system for a turbine engine, comprising:
   at least one infrared sensor that senses infrared radiation within the turbine engine;
   at least one ultraviolet light sensor that senses ultraviolet light within the turbine engine;
   at least one processor in communication with the at least one infrared sensor and the ultraviolet light sensor for determining the existence of a lack of flame condition;
   wherein the at least one processor includes a receiver for receiving signals from the infrared sensor, wherein the at least one processor ignores a steady state signal and analyzes a dynamic signal received from the infrared sensor to determine a lack of flame condition in a combustor of the turbine engine;
   wherein the at least one processor includes a receiver for receiving signals from the ultraviolet light sensor, wherein the at least one processor analyzes a dynamic signal received from the ultraviolet light sensor to determine a lack of flame condition in a combustor of the turbine engine;
   wherein the at least one processor receives signals from the infrared sensor and from the ultraviolet sensor within a threshold time period and analyzes the signals to determine whether both the infrared and the ultraviolet light sensors indicate a lack of flame condition in a combustor of a turbine engine; and
   wherein, if both the infrared sensor and the ultraviolet light sensor indicate that a flame does not exist, the at least one processor sends a signal representing that a flame does not exist in the combustor so that the turbine engine may be shutdown.

2. The flame detection system of claim 1, wherein the at least one ultraviolet light sensor and the at least one infrared sensor each transmit a signal to the at least one processor at least every five seconds.

3. The flame detection system of claim 1, wherein the at least one ultraviolet light sensor and the at least one infrared sensor each transmit a signal to the at least one processor at least every two seconds.

4. The flame detection system of claim 1, wherein the at least one processor includes a receiver for receiving signals from the at least one ultraviolet light sensor, wherein the at least one processor analyzes a dynamic signal received from the at least one ultraviolet light sensor to determine a lack of flame in a combustor of the turbine engine.

5. A method for determining a presence of a flame in a turbine engine, comprising:
   receiving signals generated by a flame detection system for a turbine engine, the flame detection system comprising:

at least one infrared sensor in communication with at least one combustor chamber in the turbine engine that senses infrared radiation within the turbine engine;

at least one ultraviolet light sensor in communication with the at least one combustor chamber in the turbine engine that senses ultraviolet light within the turbine engine; and at least one processor in communication with the at least one infrared sensor and the ultraviolet light sensor for determining the existence of a lack of flame condition;

analyzing the signals from both the at least one infrared sensor and the at least one ultraviolet sensor to determine whether both sensors have sensed the presence of a flame; and sending a signal representing that a flame does not exist in the combustor so that the turbine engine may be shutdown.

6. The method of claim 5, wherein analyzing the signals from both the at least one infrared sensor and the at least one ultraviolet sensor comprises ignoring a steady state signal from the at least one infrared sensor and analyzing a dynamic signal received from the at least one infrared sensor to determine the presence of a flame in a combustor of the turbine engine.

7. The method of claim 6, wherein analyzing the signals from both the at least one infrared sensor and the at least one ultraviolet sensor comprises analyzing a dynamic signal received from the at least one ultraviolet sensor to determine the presence of a flame in a combustor of the turbine engine.

8. The method of claim 7, wherein receiving signals generated by a flame detection system for a turbine engine comprises generating signals within a threshold time period.

9. The method of claim 8, wherein receiving signals generated by a flame detection system for a turbine engine within a threshold time period comprises generating a signal within each of the at least one ultraviolet sensor and the at least one infrared sensor and transmitting those signals to the at least one processor at least every five seconds.

10. The method of claim 8, wherein receiving signals generated by a flame detection system for a turbine engine within a threshold time period comprises generating a signal within each of the at least one ultraviolet sensor and the at least one infrared sensor and transmitting those signals to the at least one processor at least every two seconds.

11. A method for determining a presence of a flame in a turbine engine, comprising:

receiving signals generated by a flame detection system for a turbine engine, the flame detection system comprising:

at least one infrared sensor in communication with at least one combustor chamber in the turbine engine that senses infrared radiation within the turbine engine;

at least one ultraviolet light sensor in communication with the at least one combustor chamber in the turbine engine that senses ultraviolet light within the turbine engine; and at least one processor in communication with the at least one infrared sensor and the ultraviolet light sensor for determining the existence of a lack of flame condition;

analyzing the signals from both the at least one infrared sensor and the at least one ultraviolet sensor to determine whether both sensors have sensed a presence of a flame;

wherein analyzing the signals from both the at least one infrared sensor and the at least one ultraviolet sensor comprises ignoring a steady state signal from the at least one infrared sensor and analyzing a dynamic signal received from the at least one infrared sensor to determine the presence of a flame in a combustor of the turbine engine;

wherein analyzing the signals from both the at least one infrared sensor and the at least one ultraviolet sensor comprises analyzing a dynamic signal received from the at least one ultraviolet light sensor to determine the presence of a flame in a combustor of the turbine engine; and sending a signal representing that a flame does not exist in the combustor so that the turbine engine may be shutdown.

12. The method of claim 11, wherein receiving signals generated by a flame detection system for a turbine engine comprises generating signals within a threshold time period.

13. The method of claim 12, wherein receiving signals generated by a flame detection system for a turbine engine within a threshold time period comprises generating a signal within each of the at least one ultraviolet sensor and the at least one infrared sensor and transmitting those signals to the at least one processor at least every five seconds.

14. The method of claim 12, wherein receiving signals generated by a flame detection system for a turbine engine within a threshold time period comprises generating a signal within each of the at least one ultraviolet sensor and the at least one infrared sensor and transmitting those signals to the at least one processor at least every two seconds.

* * * * *